Nov. 6, 1945.   H. G. CAHILL   2,388,598
METHOD OF MAKING COILS
Filed Nov. 12, 1943
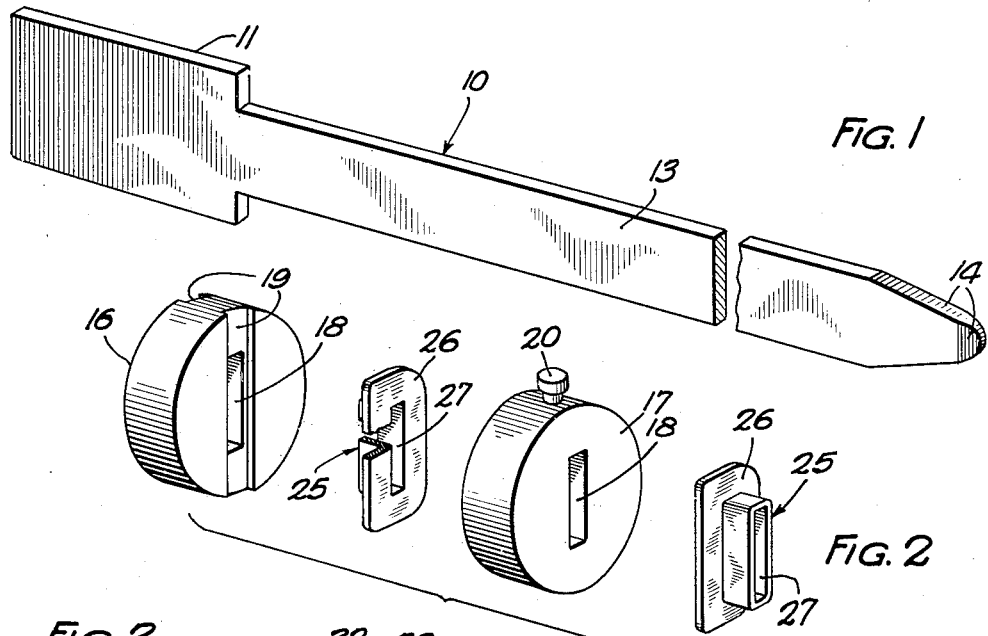
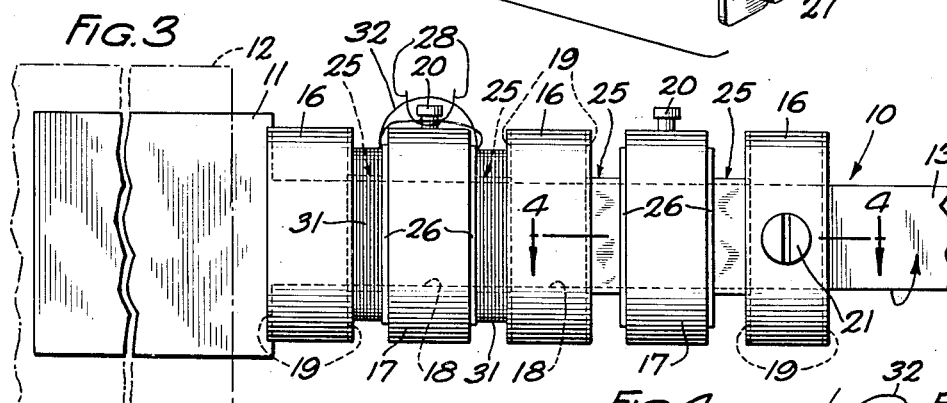
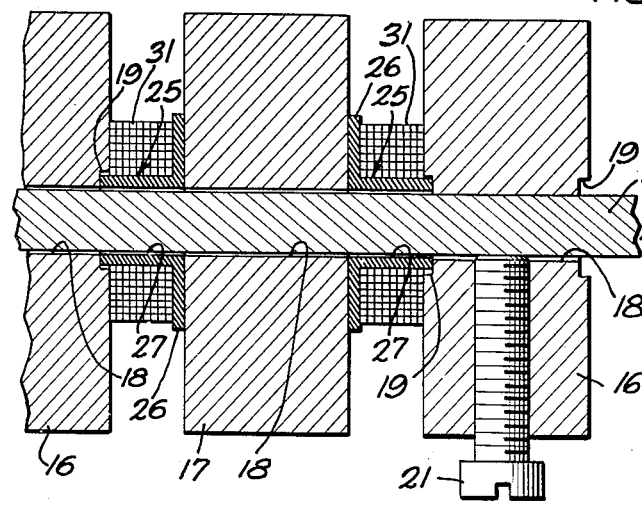
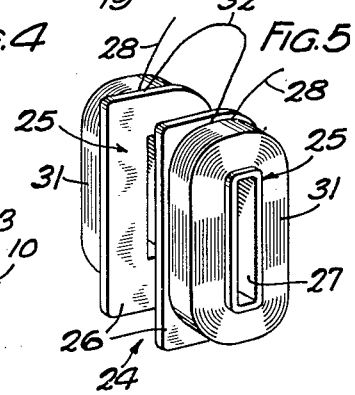
INVENTOR
H. G. CAHILL
BY Harry R. Duft
ATTORNEY Patented Nov. 6, 1945

2,388,598

UNITED STATES PATENT OFFICE 2,388,598

METHOD OF MAKING COILS

Harold G. Cahill, Riverside, Ill., assignor to Western Electric Company, Incorporated, New York, N. Y., a corporation of New York Application November 12, 1943, Serial No. 510,073

4 Claims. (Cl. 175—21)

This invention relates to improvements in the manufacture of electrical coils, and more particularly to a method of making small telephone or radio receiver coils.

Objects of the invention are to provide a simple and inexpensive method of making electrical coils.

One embodiment of the invention contemplates the provision of a method of manufacturing small radio receiver coils, in which the coils are wound in pairs on single-headed spools placed on opposite sides of a spacing collar removably mounted on a winding arbor. A coating of cement is applied to the peripheries of the coils before they are removed from the arbor and the exposed end surfaces of the coils are similarly coated with cement after removal of the coils from the arbor, whereby the coils are hermetically sealed.

A more complete understanding of the invention may be had from the following detailed description when read in conjunction with the accompanying drawing, in which Fig. 1 is a fragmentary perspective view of the winding arbor;

Fig. 2 illustrates in perspective the spacer collars and a pair of single-headed spools;

Fig. 3 is an elevational view of a portion of the winding arbor with two pairs of spools and a corresponding number of collars mounted thereon, one pair of spools being shown wound;

Fig. 4 is an enlarged section taken on the line 4—4 of Fig. 3, the spools being shown wound; and Fig. 5 is a perspective view of a completed pair of interconnected coils after their removal from the winding arbor and spacing collar, the coils being shown greatly enlarged from their actual size.

Referring to the drawing, a blade-like winding arbor 10 is shown which is enlarged at one end 11 for insertion in a rotary driving chuck included in the winding machine, the chuck being shown fragmentarily at 12 in broken outline, by means of which rotary motion is transmitted to the arbor during coil winding operations. The winding machine with which the present apparatus is used is not shown since it is not believed necessary to a complete understanding of the invention. From the enlarged arbor end 11 to its opposite end, the arbor 10 takes the form of a relatively narrow blade 13 of suitable length to accommodate a plurality of pairs of coils during their winding and is tapered at its end as indicated at 14 to facilitate the threading thereonto of certain elements to be immediately described.

Removably mounted on the arbor blade 13 are two sets of collars 16 and 17, which, in the present embodiment, may be similar in width and diameter. Each of the collars 16 and 17 is centrally apertured, as indicated at 18, to freely receive the arbor blade 13. The collars 16 are each provided with a shallow radially extending groove 19, in each of its end faces, the grooves being aligned with and extending parallel to but slightly wider than the apertures 18 and across the entire end faces of the collars. Extending from the periphery of and drive-fitted in each of the collars 17 intermediate its end faces is an anchoring pin 20 for the terminal ends of each pair of coils, which will be referred to presently.

As clearly shown in Fig. 3, an arrangement of collars 16 and 17 is shown, for example, set up on the arbor 10, for winding two pairs of interconnected coils although the length of the arbor blade 13 is such that a greater number of pairs of coils may be wound thereon. In any case, the right-hand collar 16 is equipped with a set screw 23 arranged to engage the side face of the blade 13 to retain the collars 16 and 17 from moving longitudinally thereof during the winding operations.

The small radio receiver coils which are wound in interconnected pairs, indicated in general at 24 (Fig. 5), on the apparatus above described, each comprises a spool 25 of molded plastic material having a single head 26 and a slot 27 for receiving the arbor blade 13. Terminal ends are shown at 28 of interconnected coils of wire 31 wound on each pair of spools 25, an interconnecting length of wire between the coils of wire 31 being indicated at 32.

In practicing the method of this invention for making the described pairs of interconnected coils 24, the arbor blade 13, before being secured to the winding machine chuck 12, is assembled with the required number of collars 16 and 17 and spools 25, which are slid thereonto. First one of the collars 16, without the set screw 21, is slid onto the tapered end of the blade 13 followed by a spool 25 with the headless end thereof toward the right end face of the collar 16 and entered in the groove 19 thereof (Fig. 3). Then a collar 17 is slid into position against the head 26 of the spool followed by another spool 25 with the head 26 thereof toward the right end face of the collar 17. This is followed by another collar 16, the headless end of the spool being entered in the groove 19 thereof, and for each pair of interconnected coils 24 to be wound, the above procedure is repeated, except that the last collar 16 slid onto the arbor blade 13 is equipped with the set screw 21. The purpose of the grooves 19 which receive the headless ends of the spools 25 is to insure that a small portion of the spool will be left unwound upon completion of the winding thereof so that in any expansion of the winding longitudinally along the spool it will always be supported thereon. In mounting the collars 17 in position, it is desirable that the terminal anchoring pins 20 carried thereby should be in alignment. After assembling the required number of collars 16 and 17 and spools 25 on the arbor blade 13, they are slid to the left (Fig. 3), closing up all space therebetween, the first or left-hand collar 16 being abutted against the enlarged arbor end 11 with the shouldered edge faces thereof entered in the groove 19. The set screw 21 in the right-hand collar 16 is then tightened and the enlarged end 11 of the arbor 10 is inserted in the chuck 12 of the winding machine.

Each pair of interconnected coils 24 is wound in the following manner. The end of the wire to be wound is led from a supply source (not shown), wrapped several turns around the anchoring pin 20 carried by the extreme left-hand collar 17 (Fig. 3) and wound upon the spool 25 at the left thereof, the arbor 10 being rotated in the direction of the arrow at the right end thereof (Fig. 3). Upon completion of the winding on this spool 25, the wire is crossed over the collar 17 to form the interconnecting length of wire 32 between the pair of coils 24, and the winding of the spool 25 immediately to the right thereof is then completed, after which the arbor 10 is stopped and the wire wrapped several turns around the anchoring pin 20, which was previously wrapped with the wire, whereupon the wire from the supply source is severed. The wire ends wrapped around the anchoring pin 20 thus form the terminal ends 28 of the pair of coils 24.

With the winding of the interconnected coils 24 thus completed, the peripheries thereof are brushed with a suitable cement to hermetically seal and strengthen the windings and prevent unravelling and allowed to dry for approximately one minute and the whole assemblage, comprising the collars 16 and 17 and coils 24, is removed from the chuck 12. The set screw 21 in the extreme right-hand collar 16 (Fig. 3) is loosened and while the assemblage rests flat on a bench, the collars 16 and 17 and coils 24, adhering to each other due to the cement, are carefully slid off the arbor 10 as a unit. Thereafter, the adhering collars 16 at each end of the pairs of coils 24 are separated carefully from the headless ends of the spools 25 by sliding them gently in the direction of the grooves 19 in the collars, a pair of coils 24 now being supported on a collar 17. As thus supported, the outer end faces of the coils 24 are brushed with a cement to further hermetically seal and strengthen the windings and allowed to dry for approximately one minute. After unwrapping the terminal ends 28 of the pair of coils 24 from the anchoring pin 20 of the collar 17, the completed coils are freed from the collar by gently inserting a knife-edged tool between the adhered spool heads 26 and the end faces of the collar. It may be desirable to recess the opposed faces of the collars 17 to receive the spool heads 26 and thus prevent the wire, during the winding operation, from being wound on the periphery of the head or tending to get between the abutting collar and spool head faces.

It will be understood that the embodiment of the invention above described is merely illustrative of one application thereof and that modifications can be made and it is capable of other applications.

What is claimed is:

1. A method of making a pair of coils on single-headed spools which comprises forming a confined space and winding an interconnected pair of coils on single-headed spools in said space, cementing the exposed outer peripheries of the coils, then removing the spools and coils from said space, and cementing the headless faces of the coils.

2. A method of making a pair of coils on single-headed spools which comprises mounting a pair of said spools on an arbor with spacing collars forming a confined space, winding interconnected coils on said spools, cementing the exposed peripheries of the coils, removing the collars from the headless ends of the spools, and cementing the headless faces of the coils.

3. A method of making interconnected pairs of strand wound coils comprising mounting a pair of single-headed spools and a spacing element therebetween in abutting relation and with abutments at the outer ends of the spools on an arbor, anchoring the end of a strand to be wound on the spools to the spacing element, leading the anchored strand to one of the spools, causing the spool to be wound, crossing the strand from the wound spool over the spacing element to the other spool to be wound, causing the second spool to be wound, anchoring the end of the wound strand on the second spool to the spacing element, cementing the peripheries of the wound coils, removing the interconnected coils from the arbor, spacing element and abutments after the cement has dried, and cementing the end faces of the coils at the headless ends of the spools.

4. A method of making interconnected pairs of strand wound coils comprising sliding a pair of single-headed spools and a spacing collar therebetween in abutting relation and with collars at the outer ends of the spools on an arbor, anchoring the end of the strand to be wound on the spools to the spacing collar, leading the anchored strand to one of the spools, causing the spool to be wound, crossing the strand from the wound spool over the spacing collar to the other spool to be wound, causing the second spool to be wound, anchoring the end of the wound strand wound on the second spool to the spacing collar, cementing the peripheries of the wound coils, then sliding the interconnected coils and collars adhered thereto by the cement off the arbor after the cement has dried, removing the collars from the outer ends of the spools, cementing the end faces of the coils, and then removing the interconnected coils from the spacing collar after the cement has dried.

HAROLD G. CAHILL.